(12) United States Patent
Bailey

(10) Patent No.: US 7,238,957 B2
(45) Date of Patent: Jul. 3, 2007

(54) METHODS AND APPARATUS FOR PRESENTING IMAGES

(75) Inventor: Theodore B. Bailey, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 11/120,492

(22) Filed: May 2, 2005

(65) Prior Publication Data

US 2007/0034814 A1 Feb. 15, 2007

(51) Int. Cl.
*G09G 3/20* (2006.01)

(52) U.S. Cl. .................... 250/504 R; 356/51

(58) Field of Classification Search .................. 356/51
See application file for complete search history.

(56) References Cited

U.S. PATENT DOCUMENTS 5,319,214 A * 6/1994 Gregory et al. ......... 250/504 R

* cited by examiner

*Primary Examiner*—David A. Vanore
(74) *Attorney, Agent, or Firm*—Noblitte & Gilmore, LLC

(57) ABSTRACT

An imaging system for presenting an image to a viewer comprises a radiation source configured to generate radiation having different spectral characteristics, and multiple independently operable optical switches configured to selectively transmit, reflect, and/or block radiation from the radiation source to the viewer.

20 Claims, 9 Drawing Sheets

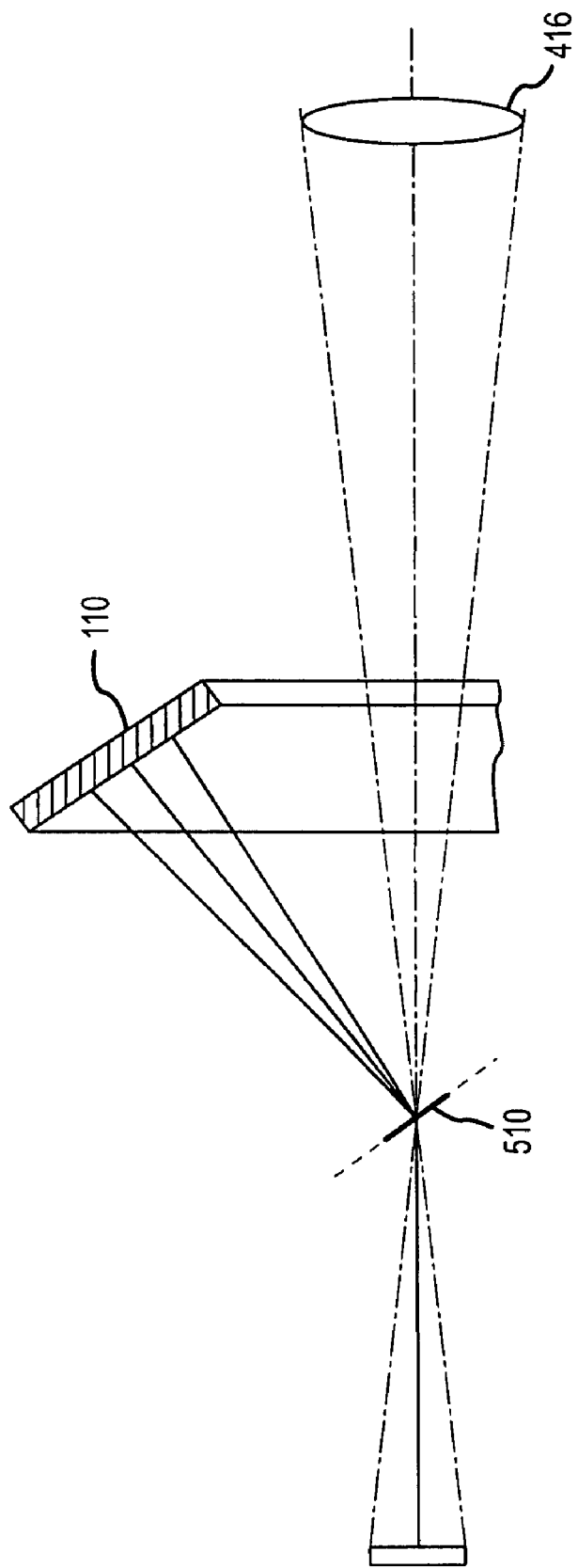

METHODS AND APPARATUS FOR PRESENTING IMAGES

BACKGROUND OF THE INVENTION

1. Field of the Invention

The invention pertains generally to methods and apparatus relating to presenting images.

2. Description of Related Art

Imaging sensors are often the viewing port for complex systems such as seekers, unmanned air vehicles, surveillance and reconnaissance systems, and forward-looking infrared systems. Testing these systems by viewing scenes in the real world can be expensive, time consuming, and limited in the types of tests that can be conducted due to availability of specific scenarios for testing. Less sophisticated optical systems may be tested with simple target and scene generators, but as more sophisticated systems based on high resolution and multi-spectral imaging sensors are developed, conventional target and scene generation may not be adequate.

BRIEF SUMMARY OF THE INVENTION

An imaging system for presenting an image to a viewer comprises an electromagnetic radiation source configured to generate radiation having multiple spectral characteristics, and multiple independently operable optical switches configured to selectively transmit, reflect, and/or block radiation from the radiation source to the viewer. The viewed image is made up of pixels defined by the selective operation of the optical switches with the radiation source. Such an image generator is capable of creating images with more varied and closer to true spectral characteristics than conventional image generators and projectors.

BRIEF DESCRIPTION OF THE DRAWING FIGURES

A more complete understanding of the present invention may be derived by referring to the detailed description and claims when considered in connection with the figures, wherein like reference numbers refer to similar elements throughout the figures, and:

FIG. 6 is a diagram of an optical path for the image projection system;

Figure 7B:
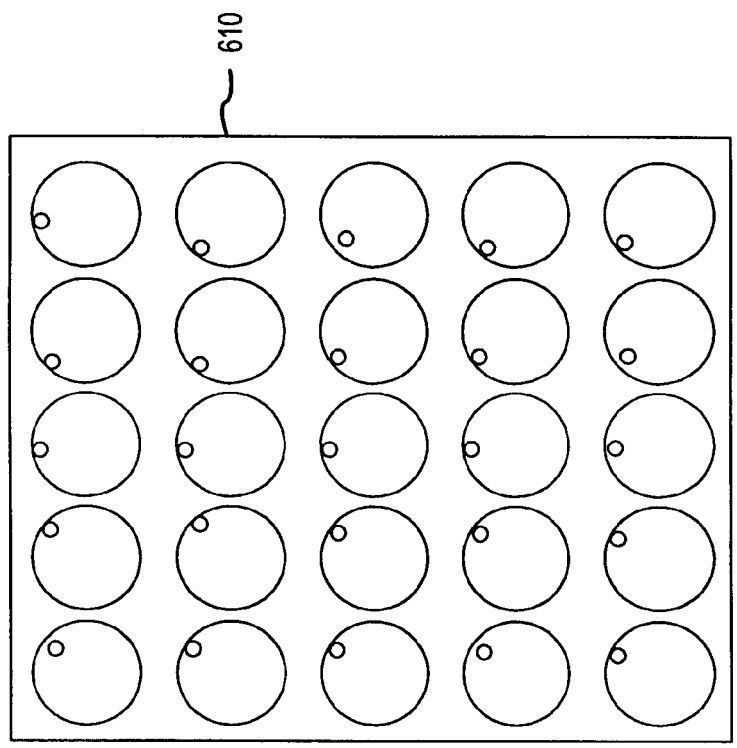
Figure 7A:
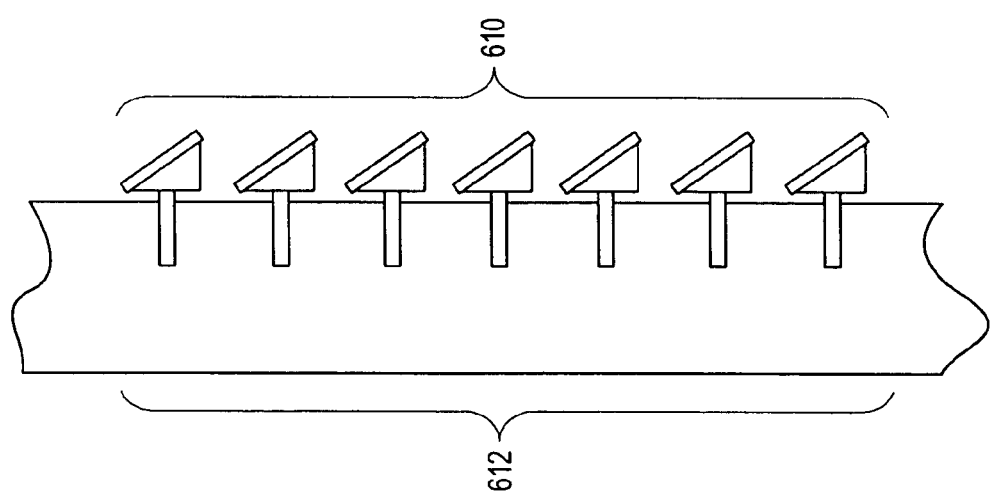
Figure 8:
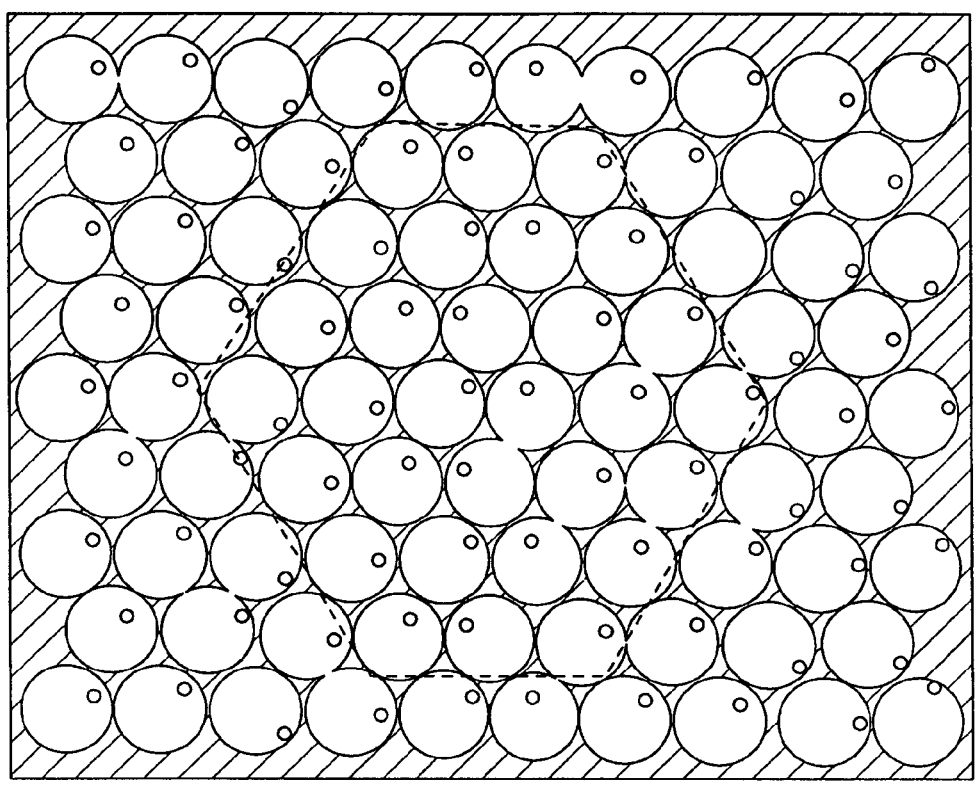
Figure 9:
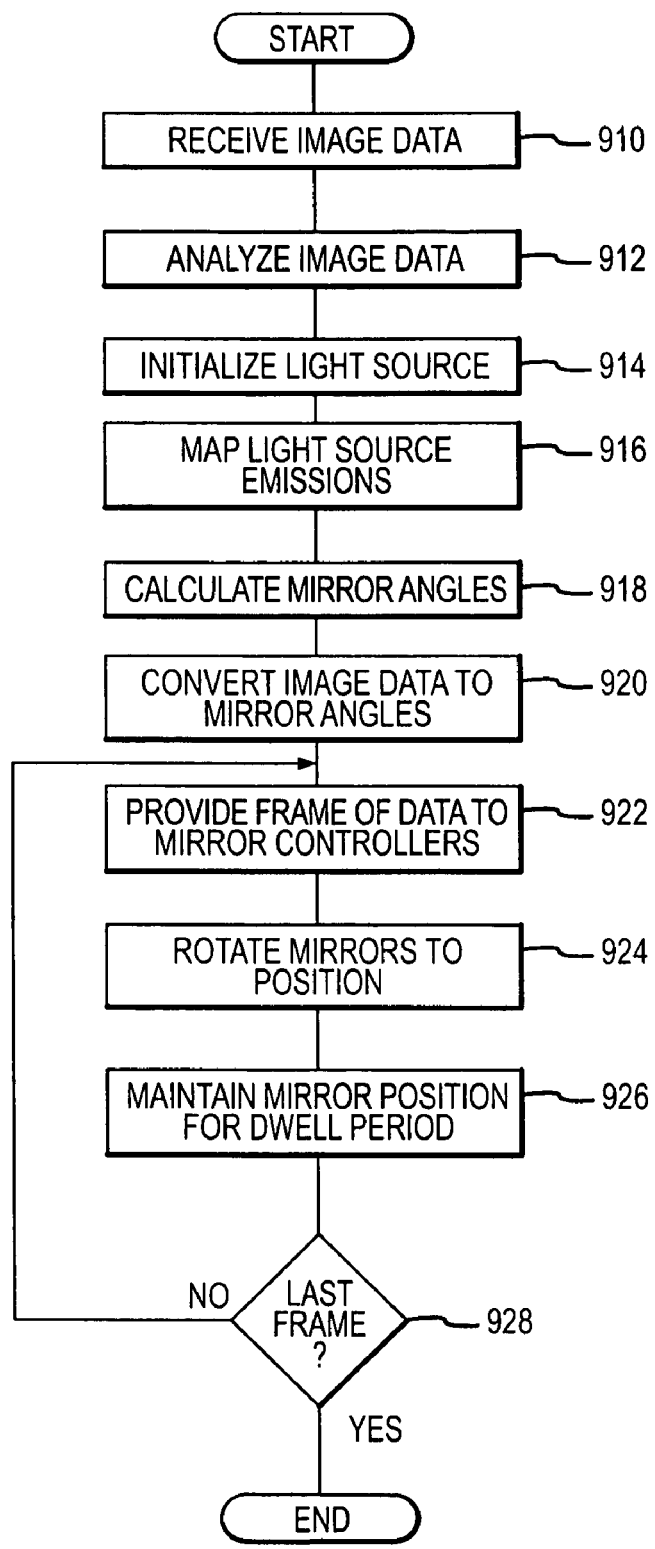

FIGS. 7A–B are a side cross-section view diagram and a front view diagram of a mirror array;

FIG. 8 is a front view diagram of an alternative mirror array configuration; and FIG. 9 is a flow diagram of a preparation and presentation process for image projection.

DETAILED DESCRIPTION OF EXEMPLARY EMBODIMENTS

The present specification and accompanying drawing show an exemplary embodiment by way of illustration and best mode. While these exemplary embodiments are described, other embodiments may be realized, and logical, optical, and mechanical changes may be made without departing from the spirit and scope of the invention. The detailed description is presented for purposes of illustration only and not of limitation. For example, the steps recited in any of the methods or process descriptions may be executed in any suitable order and are not limited to the order presented. Further, conventional mechanical and optical aspects and elements of the individual operating components of the systems may not be described in detail. The representations of the various components are intended to represent exemplary functional relationships, positional relationships, and/or physical couplings between the various elements. Many alternative or additional functional relationships, physical relationships, optical relationships, or physical connections may be present in a practical system.

The present invention is described partly in terms of functional components and various methods. Such functional components may be realized by any number of components configured to perform the specified functions and achieve the various results. For example, the present invention may employ various materials, mirrors, radiation sources, collimators, control systems, shapes, sizes, and weights for various components, such as optical components, mechanical components, and the like, which may carry out a variety of functions. In addition, the present invention may be practiced in conjunction with any number of applications and environments, and the systems described are merely exemplary applications of the invention. Further, the present invention may employ any number of conventional techniques for manufacture, deployment, and the like.

An image projection system according to various aspects of the present invention presents images to a viewer, such as an infrared image for use in testing infrared sensors or a video system for providing visual information. The image projection system transmits or reflects visible light or other radiation, for example using a micro-mirror array, from a radiation source. The radiation source generates radiation having different optical characteristics, such as different infrared spectral distributions, at different locations. The image projection system projects the scene made up of pixels defined by the selective mirror reflections of the radiation source to a viewer, such as a human viewer, an imaging sensor, a seeker, or other detection device to provide a realistic scene for test and evaluation of the sensor in the laboratory.

The image projection system may be implemented in any suitable manner. For example, referring to FIG. 1, an exemplary image projection system 100 may comprise a radiation source 110 and an optical switch system 112. The radiation source 110 generates radiation having different spectral characteristics, such as color, intensity, frequency, and polarization. The optical switch system 112 may include multiple independently operable optical switches to selectively transmit, reflect, or block radiation from the radiation source 110 to the viewer. The characteristics of the radiation provided by the radiation source 110, the functions of the optical switch system 112, and/or other operations may be controlled by a control system 114.

The radiation source 110 provides radiation that is selectively transmitted to the viewer to form the image. The radiation source 110 may comprise any suitable system for generating radiation having different spectral characteristics, such as a white or near-white light source, multiple filaments, diodes, or the like, one or more lasers, and/or a heat source having different heat zones or multiple heating elements at different temperatures. The radiation source 110 suitably presents radiation having different spectral characteristics at different locations.

For example, an exemplary radiation source 110 comprises an infrared radiation source for providing different spectral distributions and/or intensities of infrared radiation for testing infrared sensors. In alternative embodiments, the radiation source 110 may emit radiation in the visible light range and or other spectral regions. The infrared radiation source 110 of the present embodiment has a large dynamic range for black and gray body response. The radiation source 110 may be implemented such that one or more spectral characteristics of the generated radiation may vary according to a spatial gradient across the radiation source 110, for example as a black body that varies in temperature from one side to the other.

Figure 2:
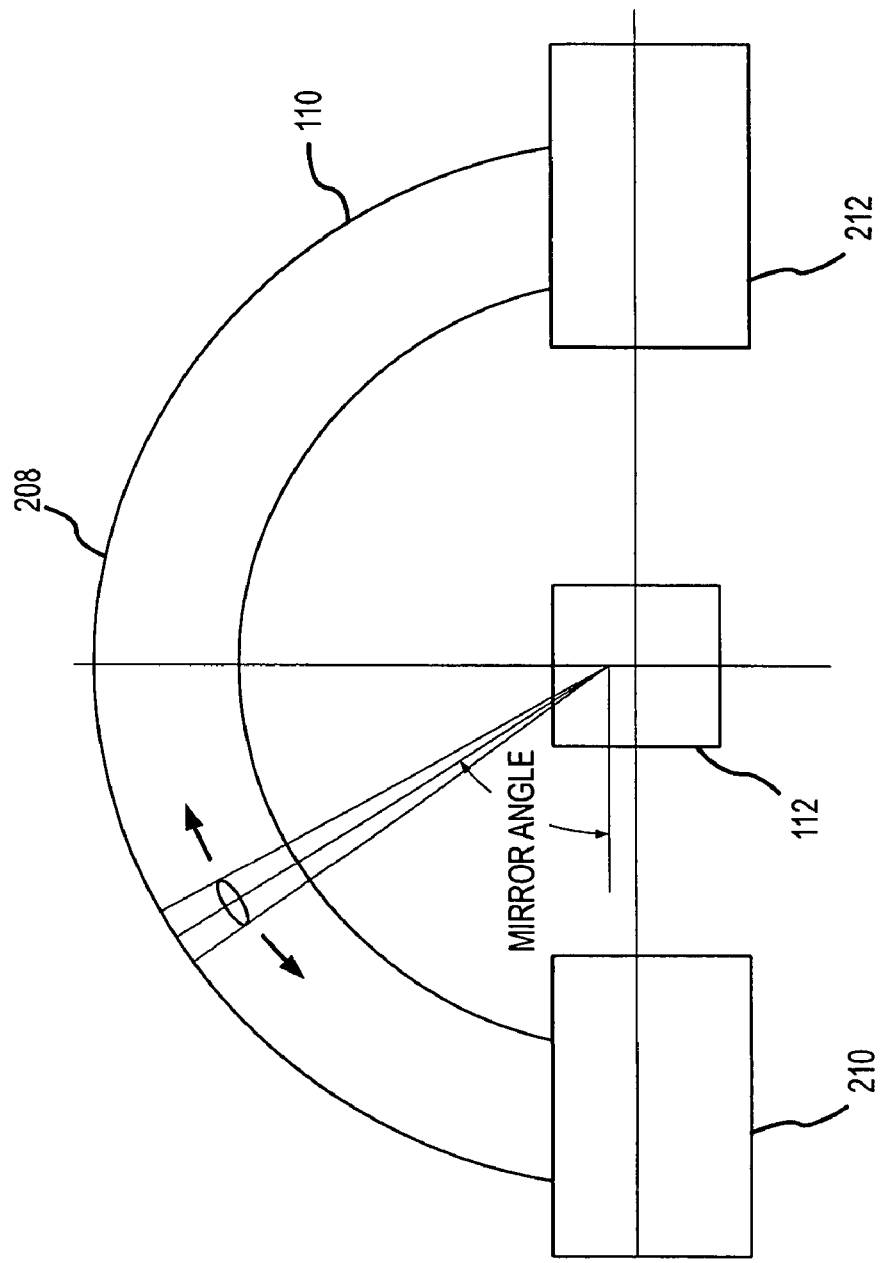
FIG. 2 is a diagram of a radiation source having a heat source and a heat sink.

The apparent temperature of a pixel transmitted to the viewer by the optical switches 112 varies with the section of the radiation source 110 displayed. The temperature of the radiation source 110 of the present embodiment varies from maximum to minimum from one side of the radiation source 110 to the other. For example, referring to FIG. 2, the radiation source 110 may comprise a substantially homogeneous thermal conductor 208 with a thermal source 210 on one end and a heat sink 212 on the other. Generating heat at one end and dissipating heat at the other provides a substantially linear distribution of temperature about the radiation source 110. Alternatively, the radiation source 110 may comprise multiple individual heating and cooling elements distributed about an area to provide an appropriate temperature distribution.

The radiation source 110 may also be further configured to enhance performance. For example, the front surface of the radiation source 110 may be coated with a Lambertian optically black emitter material, and the backside is suitably insulated. The radiation source 110 may further include feedback sensors at various locations on the radiation source 110 to provide temperature feedback to the control system 114. The control system 114 may control the thermal source 210 and the heat sink 212 such that the full dynamic range of the scene to be projected is covered. The apparent temperature of a particular pixel thus becomes a function of the temperature of that portion of the radiation source transmitted by the particular optical switch.

Figure 3:
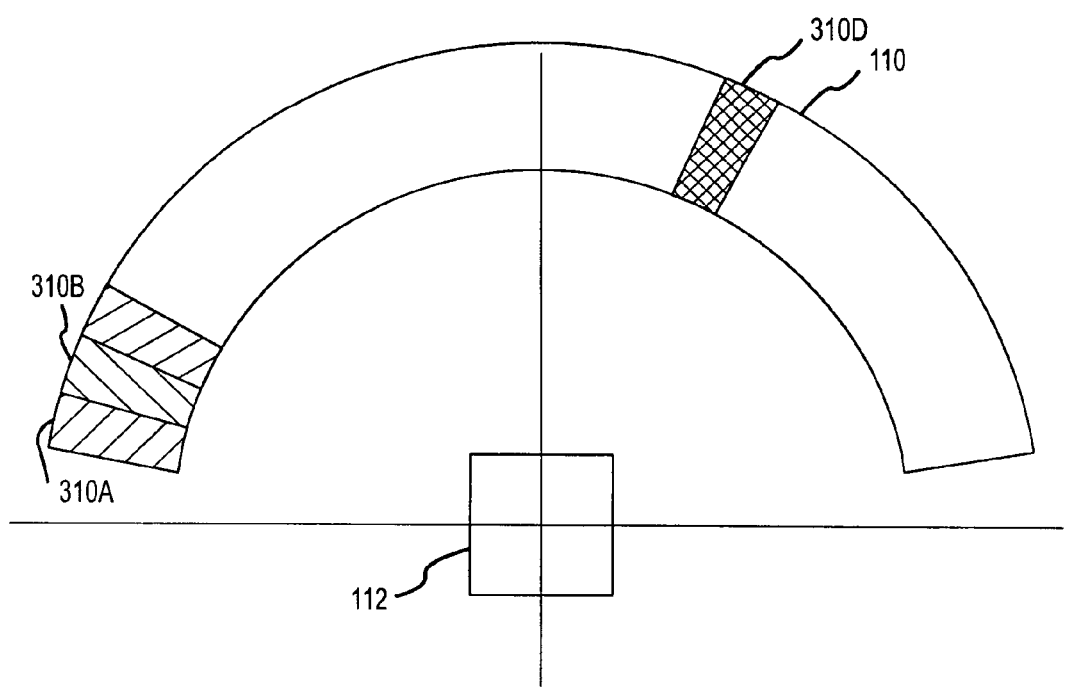
FIG. 3 is a diagram of a radiation source having a graded temperature black body and one or more non-black body emitters.

The radiation source 110 may also include a non-homogeneous thermal conductor or multiple heat sources or other source radiation elements to generate the desired spectral characteristics. For example, the radiation source 110 may be configured to project pixels with non-black body spectral characteristics, such as hot gas emissions spectra to simulate the jet plume of an air target. Separate sections may be used to simulate very hot or very cold portions of a scene, such as cold space or the sun. Referring to FIG. 3, the radiation source 110 may include, for example, one or more non-black-body emitters (NBBEs) 310A–D, such as one or more hot gas chambers. By driving the optical switch system 112 to display the various NBBE portions of the radiation source 110, other emitters, such as hot gases, can be accurately portrayed.

Figure 4:
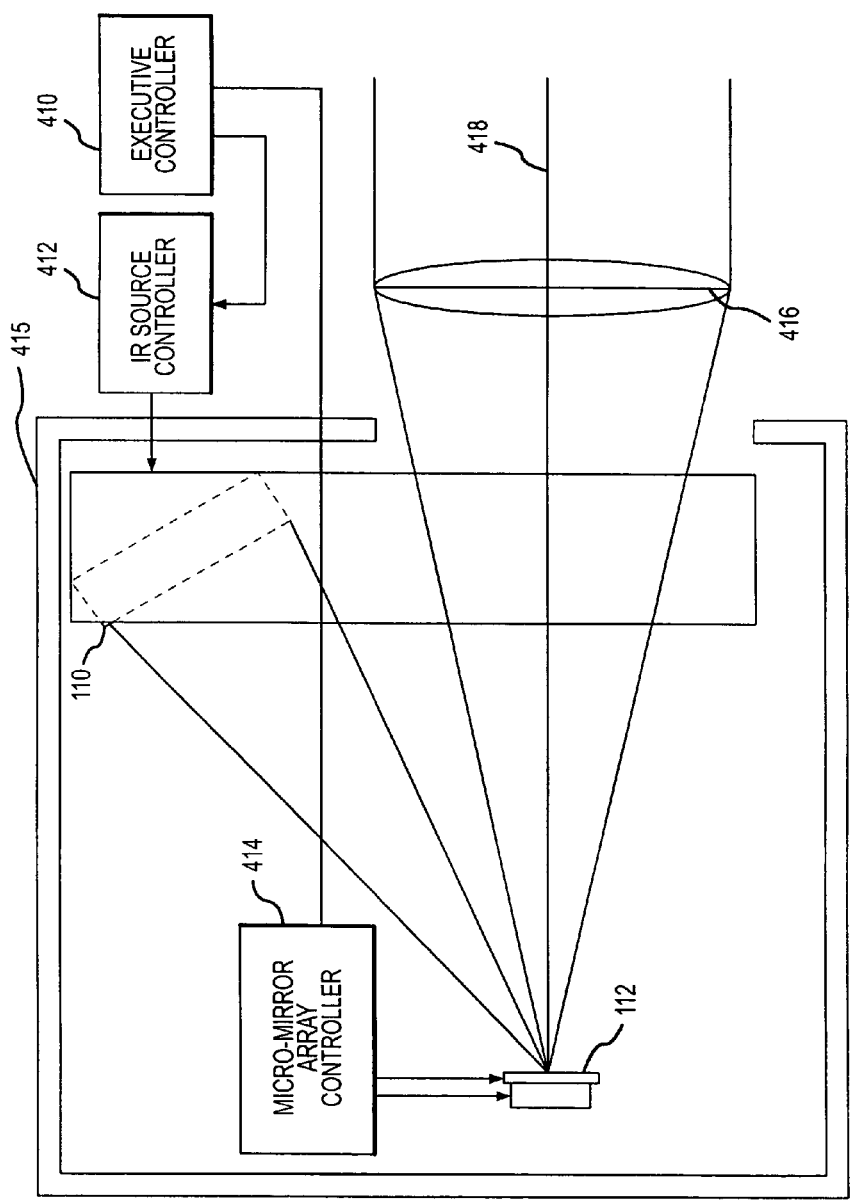
FIG. 4 is a diagram of an image projection system according to various aspects of the present invention.

The radiation source 110 may be configured in any suitable manner to facilitate selective transmission and/or reflection of radiation to the viewer, such as a panel of heating and cooling elements, a strip, or a ring. In the present embodiment, the radiation source 110 comprises an arc forming an area approximating an interior surface of a section of a cone. Referring to FIG. 4, the radiation source 110 has a surface that faces the optical switch system 112 such that the optical switch system 112 is substantially normal to the facing surface of the radiation source 110. The arc is suitably situated so that the arc is substantially centered on a central axis 418 passing through the optical switch system 112, and all parts of the radiation source 110 emitting surface are about the same distance from the optical switch system 112. Consequently, an optical switch comprising a rotating canted mirror may reflect different portions of the radiation source 110 by rotating around the central axis 418 (or a nearby substantially parallel axis) without changing azimuthal orientation.

The radiation source 110 may also generate other spectral characteristics. For example, the radiation source 110 may generate radiation at a single frequency, but vary in intensity across the arc, allowing a gray scale projection. Further, the radiation source 110 may generate different spectral distributions across the transverse area of the arc, and different intensities across the radial area of the arc. Thus, by moving in two dimensions instead of one (azimuthal and rotational), a mirror may reflect radiation having a larger number of possible characteristics, including color, intensity, polarization, and/or the like.

The optical switch system 112 transfers radiation from the radiation source 110 to the viewer according to signals from the control system 114. The optical switch system 112 may comprise any suitable system for selectively reflecting or otherwise transmitting radiation to the viewer. For example, the present optical switch system 112 suitably comprises multiple optical switches, and each optical switch may be actuated by a switch controller. Each pixel in each frame is suitably implemented by one or more optical switches.

The optical switches may comprise any suitable mechanism for transmitting or reflecting radiation from the radiation source 110 to the viewer. In the present embodiment, the optical switches are implemented via an array of mirrors. Each mirror of the array independently moves to select the desired source characteristics from the radiation source 110 and reflects it to the viewer. By selectively reflecting radiation from various areas of the radiation source 110, the image projection system 100 provides images that do not persist after the image data has changed and the mirror has moved.

Each mirror is a pixel or part of a pixel of the projected scene and is individually controlled to reflect part of the radiation source 110 to the viewing area. In the present infrared sensor testing environment, by properly reflecting a portion of the radiation source 110 corresponding to the desired temperature, it appears to the viewer that the pixel is at the desired temperature. By adjusting the positions of the mirrors, a continuum of radiation having various optical characteristics may be provided to the viewer on a pixel-by-pixel basis, resulting in control of the spectrum of each pixel displayed.

The mirrors may comprise any suitable set of mirrors for reflecting and/or transmitting radiation having the relevant optical characteristics from the radiation source 110 to the viewer, such as micro-mirrors. The micro-mirrors may comprise any appropriate array of micro-mirrors, such as a conventional array of micro-machined mirrors. The mirrors may be any appropriate size. In the present embodiment to allow the desired switching speed, the mirrors are less than about 0.070 inches in diameter and may be even smaller.

Figure 5:
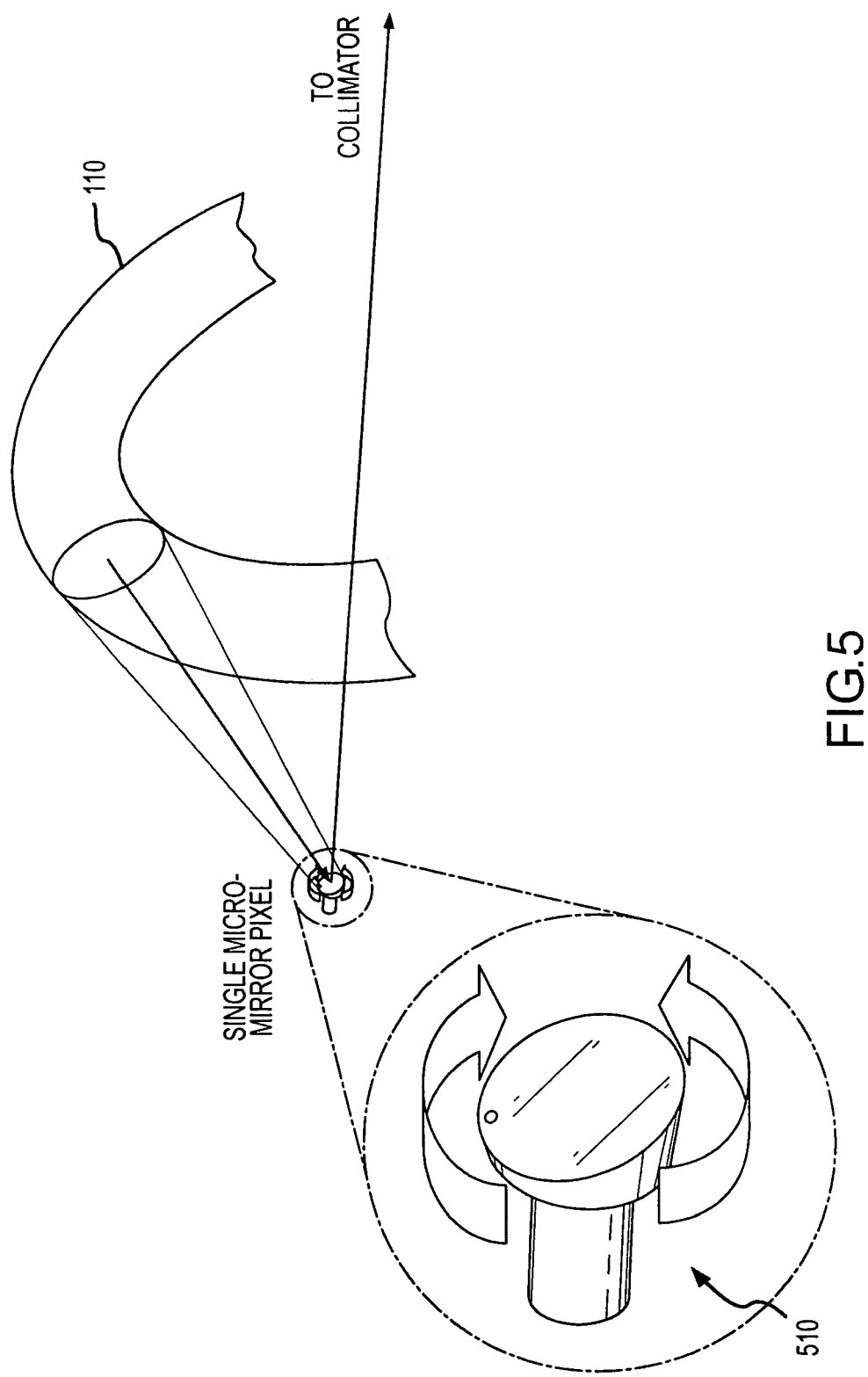
FIG. 5 is a view of a mirror and a radiation source.

The mirrors may move in any appropriate manner and in any direction. In one embodiment, the mirrors move in substantially only one dimension, such as rotationally, to reflect radiation having different optical characteristics to the viewer. For example, referring to FIG. 5, each mirror 510 may be positioned at an angle with respect to a rotation axis. The mirror 510 has a built-in tilt such that only the roll axis of the mirror 510 requires actuation. As the mirror 510 rotates around the rotation axis, the viewing path presented to the viewer sweeps out a cone that matches the arc-shaped surface of the variable radiation source 110. Thus, the angle is selected to reflect different portions of the radiation source 110 to the viewer as the mirror 510 rotates. The mirror 510 may select a portion of the radiation source 110 to present to the viewer depending upon its angular orientation and thus appear at the temperature of that portion of the radiation source 110. Referring to FIG. 6, with the mirror 510 in the focal plane of the viewer, the mirror 510 surface appears as a hole or cavity with the selected portion of the radiation source 110 in the background, thus appearing as a uniform source at the average temperature of the section of the radiation source 110 being viewed.

The array of mirrors 510 may be configured in any suitable manner to project the image to the viewer, and may be configured according to the particular environment or application. In one embodiment, referring to FIGS. 7A–B, a mirror array 610 comprises a conventional rectangular grid of rows and columns of mirrors or other optical switches (the dot represents the mirror's angular position). Alternatively, the configuration may be optimized according to mirror shape. For example, referring to FIG. 8, the mirrors 510 may be arranged to accommodate circular mirrors in a natural stacking order to maximize the fill factor or area occupied by the mirrors 510.

The control system 114 controls one or more mirrors 510 or other optical switches. For example, in the present embodiment, referring again to FIG. 7A, the optical switch system 112 includes one or more switch controllers, such as mirror controllers 612, each of which sets the appropriate angle of a single mirror 510. The mirror controllers 612 may control the orientation of the mirrors 510 according to any suitable technique or technology. For example, in the present embodiment including micro-mirrors, the mirror controllers 612 include a micro-electro-mechanical system (MEMS) that rotates each individual micro-mirror. The MEMS controller rotates the micro-mirror pixel to the required angle and thus presents the desired portion of the radiation source 110 to the viewer. In one embodiment, the MEMS controller may facilitate indexed stops at selected angles, such as in conjunction with a stepper motor or a torsional ratcheting actuator. In alternative embodiments, the mirror controller 612 may be configured to move the mirror 510 in multiple dimensions, such as in conjunction with an azimuth/elevation approach, like providing an azimuth control on a tilted mirror or the like. Fast responses of the mirror controllers 612 and mirrors 510 facilitate high data rates, for example allowing television-compatible and higher frame rates. Further, the image projection system 100 may be fast enough or synchronized with a viewing system to be compatible with both staring and scanning sensors that operate near or below conventional video frame rates, though even higher frame rates may be achievable.

Each mirror controller 612 receives information from the control system 114 indicating the desired angle position of the mirror 510 for that frame. The mirror controller 612 drives the mirror 510 to the desired angle and stabilizes at that position for the necessary dwell period for viewing. The stable dwell period is a period for each frame in which all pixels are stable. Alternatively, the mirror controller 612 may rapidly move the mirror between positions to generate a composite brightness, gray-scale, color, or other optical characteristics provided to the user for the particular frame or set of frames.

The optical switch system 112 may include any other appropriate systems for the application or environment. For example, in the present infrared application, the optical switch system 112 includes a cooler to reduce the temperature of the mirror array so that its infrared emission is negligible relative to the scene being projected. For projection of a room temperature scene, the mirror array may be cooled to only a few degrees below room temperature. For a space or sky background, however, much lower temperatures are required, which may require additional systems, such as encapsulation of the mirror array in a vacuum dewar to maintain temperature and prevent condensation. The cooler may comprise a thermo-electric cooler, a pour-fill liquid nitrogen chamber, a Joule Thompson cooler, a closed cycled cooler, or other appropriate cooler.

Referring again to FIGS. 1 and 4, the control system 114 controls the operation of the image projection system 100 according to image data. For example, the image projection system 100 of the present embodiment receives image data from a data source 116. The image data may comprise any suitable data relating to an image or series of images, such as a television signal, computer-generated image data, a signal corresponding to a motion picture in visible, infrared, or other radiation, or other data corresponding to an image. The control system 114 controls the operation of various components of the image projection system 100, such as the radiation source 110 and the optical switch system 112, according to the image data.

The control system 114 may comprise any suitable elements and be configured in any suitable manner to generate the images according to the image data. For example, the control system 114 may include a computer to analyze the image data for the values required by the radiation source 110 to generate the image. In addition, the control system 114 may convert the image data to control signals for controlling the optical switch system 112 to reflect radiation from different parts of the radiation source 110 to generate the desired image.

In the present exemplary embodiment, the control system 114 includes an executive controller 410, a radiation source controller 412, and an optical switch system controller 414. The various controllers may comprise physically separate systems, or may be integrated into one or more systems. The executive controller 410 analyzes the image data to determine the spectral characteristics and source temperatures required to generate the image. The required temperature and spectra are identified to the radiation source controller 412, which drives the radiation source 110 to generate the appropriate spectral characteristics. The executive controller 410 also maps the locations on the radiation source 110 corresponding to particular spectral characteristics, and converts the image data to positions for the various mirrors 510 to reflect the appropriate spectral characteristics to the viewer. The positions for the various mirrors 510 are transferred to the optical switch system controller 414, which adjusts the positions of the mirrors 510 or other optical switches.

For example, the executive controller 410 of the present embodiment suitably prepares and executes a motion picture presentation. The executive controller 410 receives the image data and prepares data for use by the radiation source controller 412 and the optical switch system controller 414. In particular, the executive controller 410 of the present embodiment initially receives the entire set of image data for the motion picture and analyzes the data for the various spectral characteristics in the data. For example, the executive controller 410 may identify the maximum and minimum spectral frequencies, the specific spectral frequencies, an average spectral frequency represented by the image data, or any other information that may be useful to the radiation source controller 412 or other systems. The spectral information may then be provided to the radiation source controller 412, directly to the radiation source 110, or other suitable systems. In alternative embodiments, the executive controller 410 may omit this process, for example in an image projection system 100 using a static radiation source 110 with a constant spectral range or using a rapidly responding radiation source 110, or if the image data already includes the relevant information.

The executive controller 410 may also map angular representations for the mirrors 510 to reflect selected spectral distributions, intensities, and/or other spectral characteristics. For example, the executive controller 410 may initially identify which portions of the radiation source 110 are to emit particular spectral distributions and/or intensities. The executive controller 410 may also identify mirror angles at which mirrors 510 reflect various spectral distributions and/or intensities from the radiation source 110 to the viewer. The angle information may be stored, such as in a lookup table.

The executive controller 410 further analyzes the image data to convert ordinary image data, such as pixel colors and intensities, to angular information for moving the mirrors in the mirror system 112. Conversion of the image data may be performed according to any appropriate process, and may be performed prior to presentation or at run time. For example, in the present embodiment, the image data may comprise a series of frames including pixel data, such as pixel black body temperature and other spectral characteristics, for each pixel for each frame. The executive controller 410 suitably converts the image data for each pixel for each frame into an angular position for reflecting the portion of the radiation source 110 emitting the appropriate frequency to the viewer. The converted angle data may then be stored for presentation or provided frame-by-frame to the optical switch system controller 414 for presentation.

The radiation source controller 412 controls the radiation source 110 to generate the appropriate spectral distributions, intensities, and/or other spectral characteristics for the image presentation. The radiation source controller 412 may comprise any suitable system for controlling the operation of the radiation source 110, and may control the radiation source 110 according to any suitable criteria and processes. In the present embodiment, the radiation source controller 412 receives the spectral information from the executive controller 410 and controls the radiation source 110 to generate radiation having the required spectral characteristics. The radiation source controller 412 may comprise any suitable system for controlling the radiation source 110, such as one or more digital electronics and drivers configured to drive the thermal source 210 and heat sink 212 of the radiation source 110 to the required temperatures. The radiation source controller 412 may also receive information from feedback sensors on the radiation source 110 to control the operation of the radiation source 110.

The optical switch system controller 414 controls the states of the switches in the optical switch system 112, such as the mirrors 510. The optical switch system controller 414 may comprise any suitable system for controlling the optical switch system 112, such as digital electronics and drivers that receive pixel angle information from the executive controller 410 and distribute it to the mirrors 510 to allow timely presentation. In the present embodiment, the optical switch system controller 414 functions as a video processor for receiving frames of angular data from the executive controller 410 and driving the various pixel mirrors 510 of the optical switch system 112 according to the signals to generate the desired image. The optical switch system controller 414 may operate according to any suitable configuration, however, such as asynchronously directly addressing particular pixels to adjust the pixel reflection to a different location on the radiation source 110. The mirror controllers 612 may be provided with signal storage at each pixel site such that mirror angle signal may be read into pixels asynchronously before the next frame. This allows all mirrors of the array to move to the desired orientation simultaneously, thus, reducing the overall time required for switching.

Figure 1:
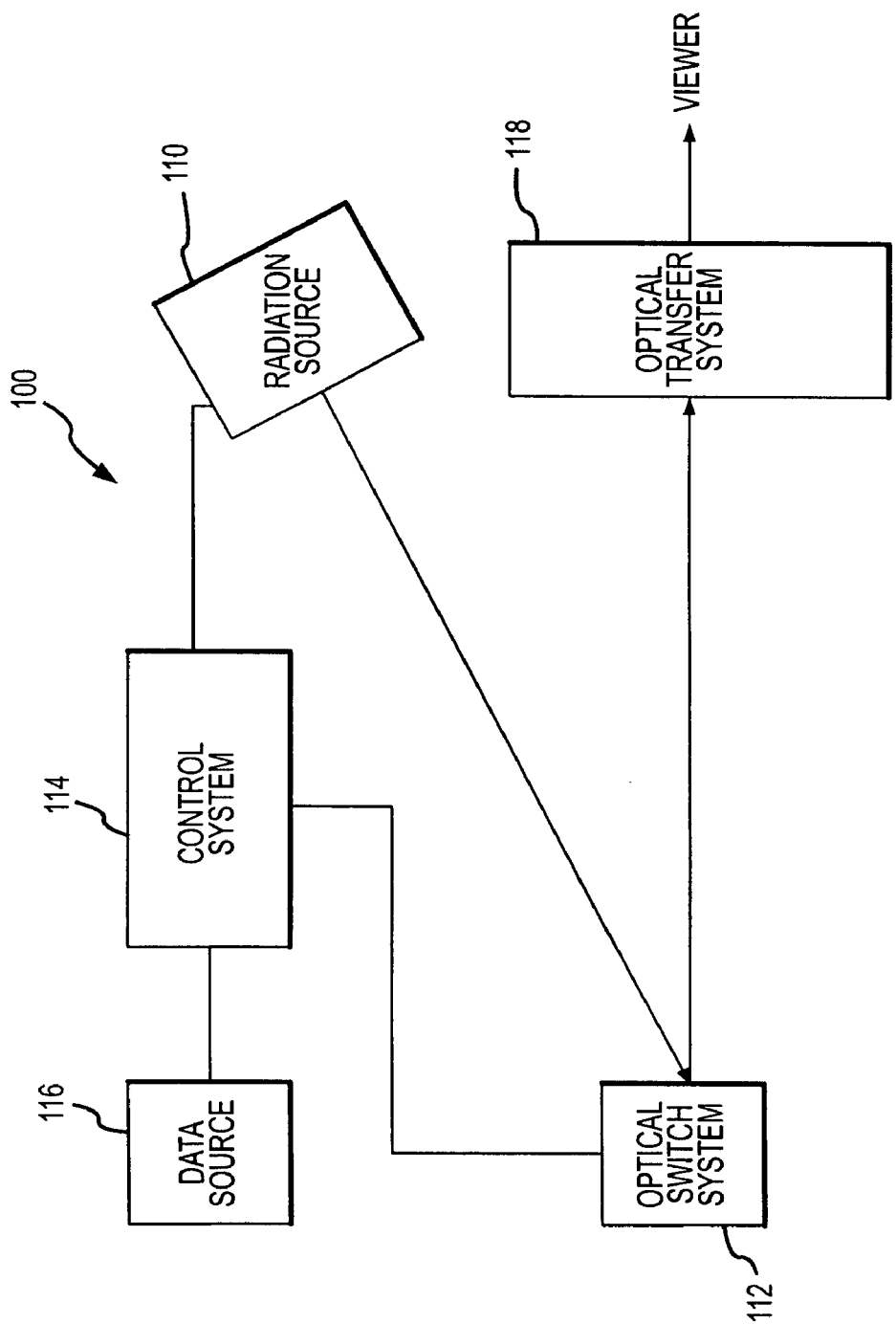
FIG. 1 is a block diagram of an image projection system according to various aspects of the present invention.

The radiation from the optical switch system 112 is transmitted to the viewer or a viewing system. The radiation may be viewed directly or, as in the present embodiment, transmitted via an optical transfer system 118 (FIG. 1). The optical transfer system 118 may perform any appropriate functions, such as collimating, focusing, or filtering the radiation. For example, in the present embodiment, the radiation is transmitted to the viewer through a housing 415 via a refraction mode collimator 416 (FIG. 4). The image projection system 100 may include any other suitable optics and other components in the optical path of the system.

In operation, the image projection system 100 prepares for the presentation and then presents the image data. The preparation process may comprise any suitable process for setting up the image projection system 100 for the presentation, such as programming the radiation source 110 to generate the appropriate optical characteristics and generating the mirror angles for each pixel in each frame of data. For example, referring to FIG. 9, the executive controller 410 initially receives the image data from the data source (910). The executive controller 410 analyzes the image data for any relevant characteristics for the presentation (912), such as the optical characteristics required to be generated by the radiation source 110. If the radiation source 110 is to be programmed, the executive controller 410 may provide the relevant information to the radiation source controller 412, which may then drive the radiation source 110 accordingly to emit the appropriate radiation (914). In addition, the executive controller 410 may map the areas of the radiation source 110 corresponding to particular optical characteristics (916) and associate each area with an angular position for the mirrors 510 (918). Thus, the desired radiation source 110 characteristics can be entered to the radiation source 110 and their locations programmed, resulting in pixel spectral characteristics with few limits.

The executive controller 410 may also convert the image data to mirror positions (920). For example, in the present embodiment, the executive controller 410 analyzes each pixel in each frame for the pixel black body temperature and/or other spectral characteristics. The executive controller 410 may then look up the desired frequency on the map of the radiation source 110 and arrive at a desired angle for the mirror 510 for the corresponding pixel. The executive controller 410 may further compensate the angle for any suitable factors that may affect the radiation source 110 or the mirror system 112, such as to remove display nonuniformity due to imperfections in MEMS and mirror fabrication. The resulting angles for the pixels for each frame may then be stored.

To begin the presentation, the executive controller 410 provides the converted image data to the optical switch system controller 412. The optical switch system controller 412 drives the mirrors 510 at the appropriate data rate. For each frame, the optical switch system controller 412 provides the angular position data for each pixel to the individual mirror controllers 612 (922), which rotate the mirrors 510 to the appropriate positions and hold them in position (924). The mirrors 510 reflect radiation from the selected area of the radiation source 110 to the optical transfer system 118, which collimates and/or otherwise processes the radiation for transfer to the viewer. To present a stable image, the mirror position may be maintained for a selected dwell period (926). The process is repeated for each frame until the last frame is transmitted (928).

The image projected by the image projection system 100 may not be fully constant when the mirrors are being adjusted. If desired, any suitable solution may be implemented to address any resulting problems. For example, if the viewer comprises a sensor being tested, the sensor may be synchronized with the mirror adjustment periods of the image projection system 100 to acquire data only during the stable dwell periods. Alternatively, data collected by the sensor during the mirror adjustment periods may be discarded from the data collection, leaving only data acquired during stable dwell periods. Also, a radiation chopper may be used to blank viewing while the mirrors are moving if the viewing sensor integrates the signal continuously as does the human eye.

Although the description above contains many details, these should not be construed as limiting the scope of the invention but as merely providing illustrations of some of the exemplary embodiments of this invention. The scope of the present invention fully encompasses other embodiments, and is accordingly to be limited by nothing other than the appended claims, in which reference to an element in the singular is not intended to mean "one and only one" unless explicitly so stated, but rather "one or more." All structural, optical, material, and functional equivalents to the elements of the above-described exemplary embodiments are expressly incorporated by reference and are intended, unless otherwise specified, to be encompassed by the claims. Moreover, it is not necessary for a device or method to address each and every problem sought to be solved by the present invention for it to be encompassed by the present claims. Furthermore, no element, component, or method step in the present disclosure is intended to be dedicated to the public regardless of whether the element, component, or method step is explicitly recited in the claims. No claim element is to be construed under the provisions of 35 U.S.C. 112, sixth paragraph, unless the element is expressly recited using the phrase "means for." The terms "comprises", "comprising", or any other variation, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An imaging system for presenting an image to a viewer, comprising:
    an infrared radiation source configured to generate infrared radiation at multiple spectral distributions, wherein the infrared radiation source generates a first spectral distribution at a first location and a second spectral distribution at a second location; and
    multiple independently movable mirrors, wherein at least one mirror is configured to reflect radiation from the first location and the second location of the infrared radiation source to the viewer.

2. An imaging system according to claim 1, wherein the at least one mirror moves in substantially only one dimension.

3. An imaging system according to claim 1, wherein the at least one mirror moves substantially only rotationally around an axis that is substantially normal to a plane defined by the movable mirrors.

4. An imaging system according to claim 1, wherein the radiation source comprises multiple electrically resistive elements.

5. An imaging system according to claim 1, wherein the radiation source generates a gradient of temperatures in a selected direction.

6. An imaging system according to claim 1, further comprising a control system connected to the mirror, wherein the control system is configured to:
    receive image data; and
    convert the image data to mirror positions.

7. An imaging system according to claim 1, wherein the radiation source comprises at least a portion of an arc, wherein the arc defines a plane substantially normal to a path of the radiation transmitted to the mirrors.

8. An imaging system according to claim 1, wherein:
    the radiation source comprises an at least partially arc-shaped surface facing the mirrors, wherein the arc-shaped surface defines a plane substantially normal to a path of the radiation transmitted to the mirrors; and
    the mirrors comprise a substantially planar mirror array, wherein each mirror in the array is mounted at an angle to an axis to reflect different positions on the radiation source as the mirror is rotated about the axis.

9. An imaging system for presenting an image to a viewer, comprising:
    an infrared radiation source configured to generate infrared radiation at a first spectral distribution at a first location on the infrared radiation source and at a second spectral distribution at a second location on the infrared radiation source;
    multiple independently movable mirror configured to reflect radiation from the infrared radiation source to the viewer, wherein each mirror reflects radiation from the first location to the viewer when the mirror is in a first position and reflects radiation from the second location to the viewer when the mirror is in a second position; and
    a control system connected to the mirror and configured to independently move each mirror between the first position and the second position.

10. An imaging system according to claim 9, wherein each of the mirror moves in substantially only one dimension.

11. An imaging system according to claim 9, wherein each of the mirrors moves substantially only rotationally around an axis that is substantially normal to a plane defined by the movable mirrors.

12. An imaging system according to claim 9, wherein the radiation source comprises multiple electrically resistive elements.

13. An imaging system according to claim 9, wherein the radiation source forms a gradient of temperatures in a selected direction.

14. An imaging system according to claim 9, wherein the control system is configured to:
receive image data; and
convert the image data to mirror positions.

15. An imaging system according to claim 9, wherein the radiation source comprises at least a portion of an arc, wherein the arc defines a plane substantially normal to a path of the radiation transmitted to the mirrors.

16. An imaging system according to claim 9, wherein:
the radiation source comprises an at least partially arc-shaped surface facing the mirrors, wherein the arc-shaved surface defines a plane substantially normal to a path of the radiation transmitted to the mirrors; and
the mirrors comprise a substantially planar mirror array, wherein each mirror in the array is mounted at an angle to an axis to reflect different positions on the radiation source as the mirror is rotated about the axis.

17. A process for presenting an infrared image to a viewer, comprising:
generating radiation at multiple infrared spectral distributions from a radiation source, wherein generating radiation at multiple infrared spectral distributions includes generating radiation at different infrared spectral distributions at different locations on the radiation source; and
selectively reflecting radiation of different spectral distributions from the radiation source to the viewer, wherein selectively reflecting radiation from the radiation source to the viewer includes reflecting radiation from the different locations to the viewer.

18. A process for presenting an infrared image according to claim 17, wherein reflecting radiation from different locations comprises moving multiple mirrors.

19. A process for presenting an infrared image according to claim 18, wherein moving multiple mirrors comprises moving the multiple mirrors in substantially only on dimension.

20. A process for presenting an infrared image according to claim 19, wherein moving the multiple mirrors includes moving the multiple mirrors around axes that are substantially normal to a plane defined by the movable mirrors.

* * * * *